United States Patent [19]
Pien

[11] Patent Number: 5,803,039
[45] Date of Patent: Sep. 8, 1998

[54] PISTON-CYLINDER ASSEMBLY AND DRIVE TRANSMITTING MEANS

[76] Inventor: Pao Chi Pien, Marbelle Club, 840 S. Collier Blvd., Marco Island, Fla. 33937

[21] Appl. No.: 667,602

[22] Filed: Jun. 21, 1996

Related U.S. Application Data

[62] Division of Ser. No. 551,797, Nov. 7, 1995.

[51] Int. Cl.⁶ .................................................... F02B 75/08
[52] U.S. Cl. ...................................... 123/197.1; 123/54.1
[58] Field of Search .............................. 123/197.3, 197.1, 123/197.4, 193.4, 54.1, 54.6, 54.7, 54.8; 91/481; 417/564

[56] References Cited

U.S. PATENT DOCUMENTS

| | | | |
|---|---|---|---|
| 1,671,400 | 5/1928 | Briggs | 123/54.1 |
| 2,271,011 | 1/1942 | Hubbard | 123/54.1 |
| 3,807,910 | 4/1974 | Paget | 417/564 |
| 4,632,017 | 12/1986 | Bokon | 91/481 |

*Primary Examiner*—Marguerite McMahon
*Attorney, Agent, or Firm*—Watson Cole Stevens Davis P.L.L.C.

[57] ABSTRACT

A cylinder body has a bore and an annular recess in communication with the bore. A piston is mounted for reciprocation within the bore, the piston having an annular skirt which reciprocates within the recess. A connecting rod has one end pivotally connected to the piston and the opposite end pivotally connected to a crankshaft for turning movement about an axis. A drive roller is rotatably carried by the crankshaft for turning movement about an axis. The drive roller is disposed in a cam groove in a flywheel which is drivingly connected to an output shaft. The two axes oscillate along two parallel arcs during reciprocation of the piston.

6 Claims, 3 Drawing Sheets

PISTON-CYLINDER ASSEMBLY AND DRIVE TRANSMITTING MEANS

This application is a divisional application of application Ser. No. 08/551,797, filed Nov. 7, 1995.

BACKGROUND OF INVENTION

The United States government, in partnership with the American automotive industry, is supporting research "that would lead to the development of emerging, next-generation technologies capable of producing an energy-efficient, pollution-free, economical, and marketable car (green car)". It may be many years before such technologies emerge. Even then, these next generation technology vehicles will require a totally new method of manufacturing, servicing and fueling such vehicles. Thus, such next generation technologies will require tremendous resources to modify existing infrastructure. Because of these factors, the ideal next generation technology would be one that is an evolution of existing automotive engine technology.

The main drawback of current piston-cylinder engine designs is the amount of exhaust pollutants produced. Inherent mechanisms of pollution formation are unavoidable; such as the lubrication oil film on the wall of the combustion chamber, flame quenching, and the crevices in the piston ring pack. The objective of the present invention is to develop a new piston-cylinder assembly configuration where the mechanisms that produce unwanted engine emissions are eliminated.

A conventional automotive engine utilizes a piston-crank assembly employing a crank shaft located along the central axis of the engine, which is connected to the pistons by long connecting rods. These connecting rods form an undesirably large reciprocating mass and also produce considerable side forces on the pistons because of the varying angular relationships of the connecting rods to the pistons.

SUMMARY OF THE INVENTION

The piston-cylinder assembly configuration of the present invention comprises a cylinder, a cylinder head which has a cylindrical portion Protruding into the cylinder to form a concentric annular recess, and an inverted piston with its cylindrical skirt reciprocating in and out of the annular recess. The crown and the skirt of the inverted piston are made separately and are connected by a tongue and groove joint. The piston skirt and crown reciprocate together and permit small sliding motions relative to one another in any direction at the joint so that side forces from a connecting rod are not transmitted to the piston skirt. Multiple annular grooves provided between the piston skirt and the cylinder serve to lengthen the effective path which combustion gases must take to leak around the inverted piston. For a gas particle leaking across the inverted piston, its path of leakage is many times longer than that of a conventional piston-cylinder configuration. Furthermore, the reciprocating motion of the piston skirt into the annular recess compresses the air within said annular recess to provide an additional seal which prevents gas leakage. Therefore, with this design, there is no need for a piston ring pack and no need for lubrication oil within the cylinder. The crown portion of the inverted piston has enough bearing surface against the cylinder to resist side forces from a connecting rod. This bearing surface is outside the combustion space and is not exposed to high temperatures; and can therefore be designed to reduce sliding friction. Therefore, the two-piece inverted piston can be very light. With a light reciprocating mass and less friction than conventional-designs, the inverted piston can have higher piston speeds. Higher piston speeds further reduce combustion gas leakage per cycle of operation and increase specific engine output.

A dry cylinder (without lubrication oil) can maintain a high enough temperature to eliminate ignition delay. Hence the piston-cylinder assembly configuration of the present invention can be applied to a constant-pressure compression-ignition (CI) engine. For a given maximum cycle pressure, a constant-pressure cycle has a much higher cycle efficiency than that of a constant-volume cycle. There are many other practical advantages of a constant-pressure cycle engine. First, combustion during a constant-pressure cycle is at a much lower firing temperature than that of a constant-volume cycle and thus produces much less NOx. Second, a constant pressure combustion process provides a longer duration for fuel injection to achieve a better fuel-air mixing and thus more complete combustion. Third, because there is a longer duration for fuel injection into a combustion chamber with only a moderate pressure, this engine design would lead to a better control of fuel injection and a cheaper fuel injection system.

The present invention may also employ a novel drive transmitting means wherein each piston is provided with a separate associated crank shaft. Each crank shaft is connected to its associated piston by a very short connecting rod and oscillates through a small arc of movement rather than rotating as a conventional crank shaft does. Each crank shaft includes a crank which carries a drive roller which rides in a cam groove formed on a flywheel common to all of the crank shafts. As I have described, this new piston-cylinder assembly configuration and drive transmitting means could be used in the next generation green car. An engine employing these features would be lighter, more fuel efficient and less polluting than any engine of today's design. The new design I have described above would run on conventional fuels regardless of their cetane or octane numbers and would not require any changes to the current manufacturing or fuel distribution infrastructure. The changes embodied in such a design would be invisible to the consumer. Therefore, this new engine concept could be used in a fuel-flexible, energy-efficient, pollution-free, economical and marketable green car.

DESCRIPTION OF THE PREFERRED EMBODIMENTS

Figure 1:
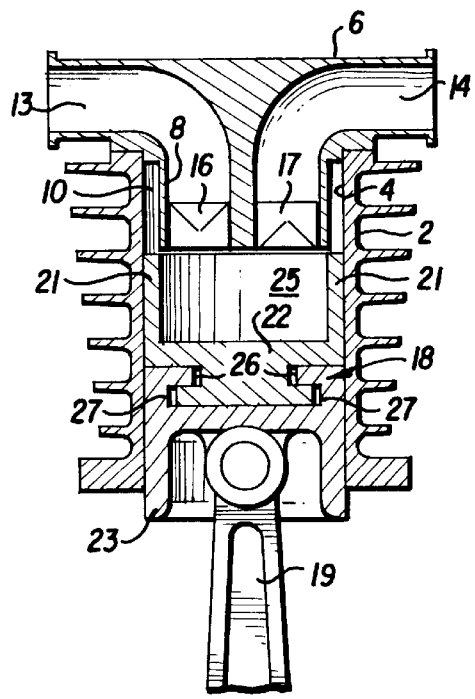
FIG. 1 is a sectional view of an air compressor with a new piston-cylinder configuration.
Figure 2:
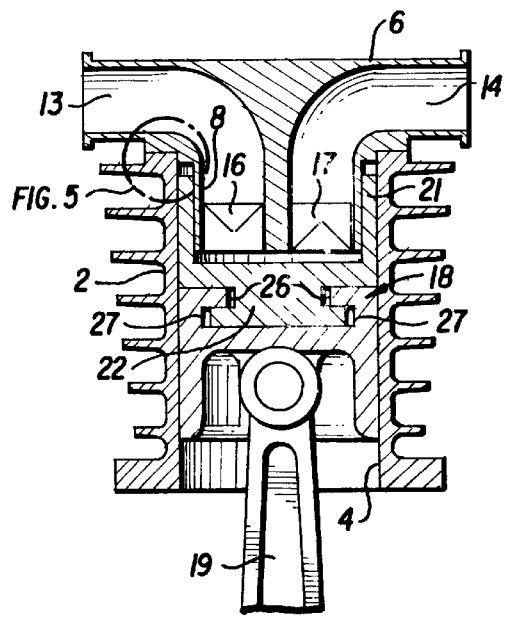
FIG. 2 is a sectional view of the air compressor shown in FIG. 1 with the piston at top dead center.
Figure 3:
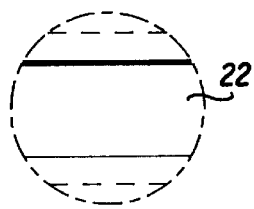
FIG. 3 is a bottom view of the piston skirt showing the tongue part of a tongue and groove joint.
Figure 4:
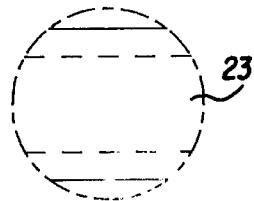
FIG. 4 is a top view of a piston crown showing the groove part of the joint.
Figure 5:
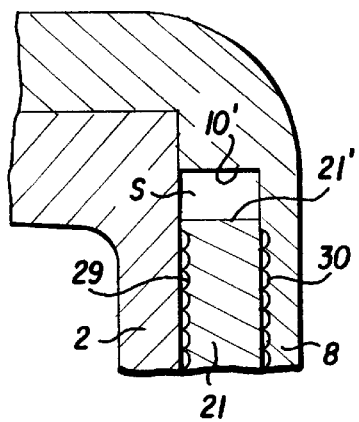
FIG. 5 is a section through a portion of FIG. 2 on an enlarged scale showing small grooves on the outer cylindrical surfaces of the piston skirt and a cylindrical portion of the cylinder head.

Referring now to the drawings wherein like reference characters designate corresponding parts throughout the several views, there is shown in FIGS. 1 to 5 an air compressor according to the present invention. A cylinder body 2 has a bore 4 therethrough with an open lower end; and a cylinder head 6 closes off the upper end of the body. A cylindrical portion 8 of cylinder head 6 protrudes into the cylinder bore 4 to form an annular recess 10. Cylinder head 6 includes an inlet passage 13 and an outlet passage 14. Cylinder head 6 carries an automatic one-way inlet valve 16 within inlet passage 13 and a one-way delivery valve 17 within outlet passage 14. An inverted piston 18 is driven by a crank shaft (not shown) through a connecting rod 19. The piston includes a piston skirt 21 formed integral with a piston portion 22. The cylinder total volume, displaced volume and clearance volume are volumes defined between cylindrical piston skirt 21 and the cylinder head portion 8. As the crank shaft rotates, inverted piston 18 reciprocates within cylinder bore 4 between the top dead center and the bottom dead center as shown in FIGS. 2 and 1 respectively. During the downward stroke, piston 18 sucks air into the space 25 through one-way inlet valve 16. Compressed air is delivered through one-way delivery valve 17 during the upward stroke of the piston. At the same time, cylindrical piston skirt 21 enters annular recess 10 to compress the air within recess 10 to form a seal for preventing air from leaking out of space 25 between the upper edge of the piston skirt and cylindrical portion 8. As seen in FIG. 5, when the piston is at top dead center position, the upper edge 21' of the piston skirt is spaced from the top 10' of recess 10 to provide an annular body of compressed air to form a seal S having a pressure higher than that in pace 25. The crown 23 of the piston and piston portion 22 are made separately and joined together by a tongue and groove joint. FIG. 3 is a bottom view of piston portion 22 and FIG. 4 is a top view of crown 23 showing two complementary parts of a tongue and groove joint. As seen in FIGS. 1 and 2, small clearances 26 and 27 are provided between the adjacent lateral surfaces on the piston portion 22 and the crown 23 of the piston to permit relative lateral movement between parts 22 and 23 in a lateral direction. Skirt 21 and crown 23 of piston 18 reciprocate together and can have a small relative sliding movement at the joint in any lateral direction. Because of the possible sliding movement between piston skirt 21 and piston crown 23, side forces from connecting rod 19 can not be transmitted to piston skirt 21 and can be transmitted only to the cylinder wall. Without side force between piston skirt 21 and the cylinder wall, it is possible to reduce the contact area between them. It is desirable to reduce the contact area in order to reduce the amount of friction between piston skirt 21 and cylinder wall and to more readily achieve the desirable gap clearance between piston skirt and cylinder wall.

In order to reduce said contact area, a plurality of small grooves 29 are formed on the outer surface of piston skirt 21 as shown in FIG. 5. Small grooves 30 are also formed on the outer surface of cylinder head portion 8 to lengthen the effective path of air leaking out of space 25 between the upper edge of the piston skirt 21 and cylindrical portion 8. An air particle leaking across inverted piston 18 has to pass through two sets of grooves and a volume of compressed air at the upper edge of piston skirt 21. Hence the air leakage per cycle across the inverted piston 18 can be kept to a minimum without a piston ring and lubrication oil. Light piston skirt 21 is automatically self centered with respect to the cylinder bore since unequal gap clearances on opposite sides would produce unequal velocities of leaking air and pressure differentials which would tend to return the piston skirt 21 to its central position. Without, lubrication oil within the compression chamber, delivered compressed air is not contaminated with lubrication oil.

Figure 6:
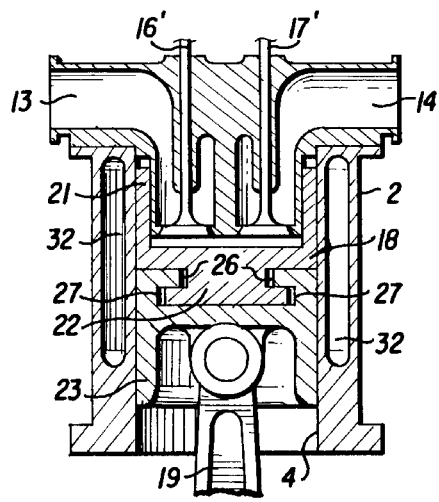
FIG. 6 is a sectional view of a four-stroke engine with the new piston-cylinder configuration.

FIG. 6 shows a cylinder-piston assembly configuration of a four stroke internal combustion engine according to the present invention. The piston-cylinder assembly geometry of a four-stroke engine is essentially the same as that of an air compressor described above except that inlet valve 16 is replaced by a poppet inlet valve 16' and delivery valve 17 is replaced by a poppet exhaust valve 17'. Either a spark plug (not shown) for a spark-ignition (SI) engine or a fuel injection nozzle (not shown) for a CI engine is also installed in the cylinder head in the usual manner. Water cooling by means of a water jacket cavity 32 is used more commonly as shown instead of air cooling. A four-stroke engine according to the present invention differs from an existing one only in two items; namely, a two-piece inverted piston and a new cylinder head. These differences not only minimize most exhaust emissions but also greatly reduce piston friction.

Both piston skirt 21 and piston crown 23 are made of light heat insulation materials. Since the bearing surface on the piston crown which resists side forces is outside the combustion chamber without being exposed to high temperature, it can be designed for a small amount of friction and wear. Having little friction and a light reciprocating mass, the inverted piston 18 can have a very high speed to reduce the cylinder leakage per cycle as well as to increase the specific engine output.

Since the cylinder is dry without lubrication oil, the combustion chamber temperature is no longer limited by the possibility of lubrication oil deterioration and can be maintained high enough to eliminate ignition delay. Without ignition delay, a constant-pressure cycle compression-ignition engine becomes achievable.

Figure 7:
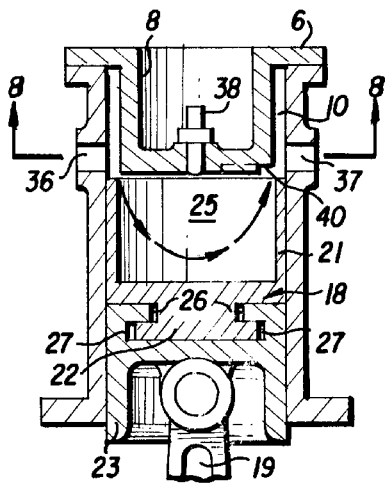
FIG. 7 is a sectional view of a two-stroke engine with the new piston-cylinder configuration.
Figure 8:
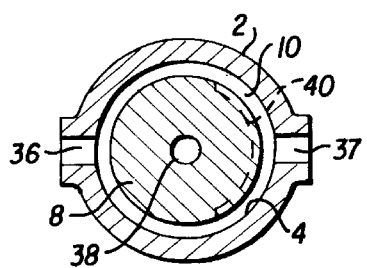
FIG. 8 is a sectional view taken long line 8—8 in FIG. 7.

FIG. 7 shows the piston-cylinder assembly configuration of a two-stroke CI engine according to the present invention. Instead of poppet valves in the cylinder head as in the case of a four-stroke engine, inlet passage 36 and exhaust passage 37 are provided on opposite sides of cylinder bore 4 and are in direct communication with annular recess 10. The inlet passage is slightly above the lower edge of cylinder head portion 8 so that the scavenging air is forced to follow a path inside space 25 as shown by the arrows. Exhaust passage 37 is lower than passage 36 so that hot exhaust gas can exit through exhaust passage 37 with a minimum change in direction. A fuel injection nozzle 38 is located in the cylinder head portion 8. There is a shallow recess 40 at the lower edge of the cylinder head portion 8 along an arc symmetrical with respect to exhaust passage 37 as shown in FIG. 8. Passages 36 and 37 are in communication with annular recess 10. The geometry of annular recess 10 and the inverted piston 18 is the same as that of the four-stroke engine.

A two-stroke engine cycle begins when inverted piston 18 is at the bottom dead center as shown in FIG. 7. Compressed scavenging air enters space 25 from inlet passage 36 through a narrow gap between the top edge of skirt 21 and lower edge of cylindrical portion 8 to produce a highly turbulent motion in space 25, whereupon the scavenging air exits through exhaust passage 37. The air turbulence is further increased during the compression process. When inverted piston moves upwardly to cut off the communication between space 25 and annular recess 10, the compression process begins within space 25. A compression process also takes place above the upper edge of piston skirt 21 when the communication of recess 10 with inlet passage 36 is cut off. At that point, the pressure on top of skirt part 21 approaches that at inlet passage 36 which is higher than that in space 25. This pressure differential is maintained during the rest of the compression stroke by having an appropriate compression ratio within annular recess 10 to ensure that the pressure in space 10 is always higher than that in space 25. Near the end of a compression stroke, fuel injection begins to start a combustion process. The temperature in the combustion chamber at the beginning of fuel injection is maintained higher than the fuel critical temperature to eliminate ignition delay. Without ignition delay, a constant pressure combustion process is achieved by coordinating the total amount of the fuel injected into the combustion chamber with the total piston movement from the top dead center position. After that, an expansion stroke follows. As soon as both inlet passage 36 and exhaust passage 37 are uncovered, compressed air from a scavenging pump blows through annular recess 10 for engine cooling. Near the end of an expansion stroke, the communication between the space 25 and exhaust passage 37 is established first (because of recess 40) to begin a blowdown process. A scavenging process begins when inlet passage 36 is also in communication with space 25. It should be noted that size and position of passages 36 and 37 control the duration and the amount of cooling air that sweeps through annular recess 10. The scavenging process is controlled by the gaps between the upper edge of piston skirt 21 and cylinder head portion 8 as piston skirt 21 moves out of the annular recess 10. After reaching the bottom dead center, piston 18 moves upward again to repeat the engine cycle.

The communication between inlet passage 36 and exhaust passage 37 is maintained even when piston skirt 21 is within annular recess 10 since a portion of the engine cooling air flows through grooves 29 on the outside surface of piston skirt 21. Without an external means for cooling, the two-stroke engine approaches an adiabatic state. Since the piston skirt 21 is self centered in the cylinder bore, there is extremely small friction and wear on these components. Whatever wear occurs on piston crown 23 will not effect the performance of piston skirt 21. Therefore, an internal combustion engine based on the present invention has extremely high durability.

Figure 10:
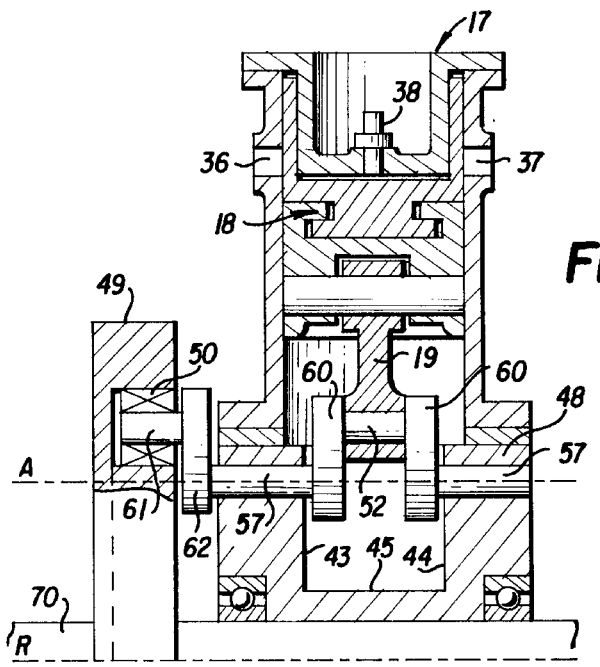
FIG. 10 is an enlarged scale sectional view taken along line 10—10 in FIG. 9.
Figure 9:
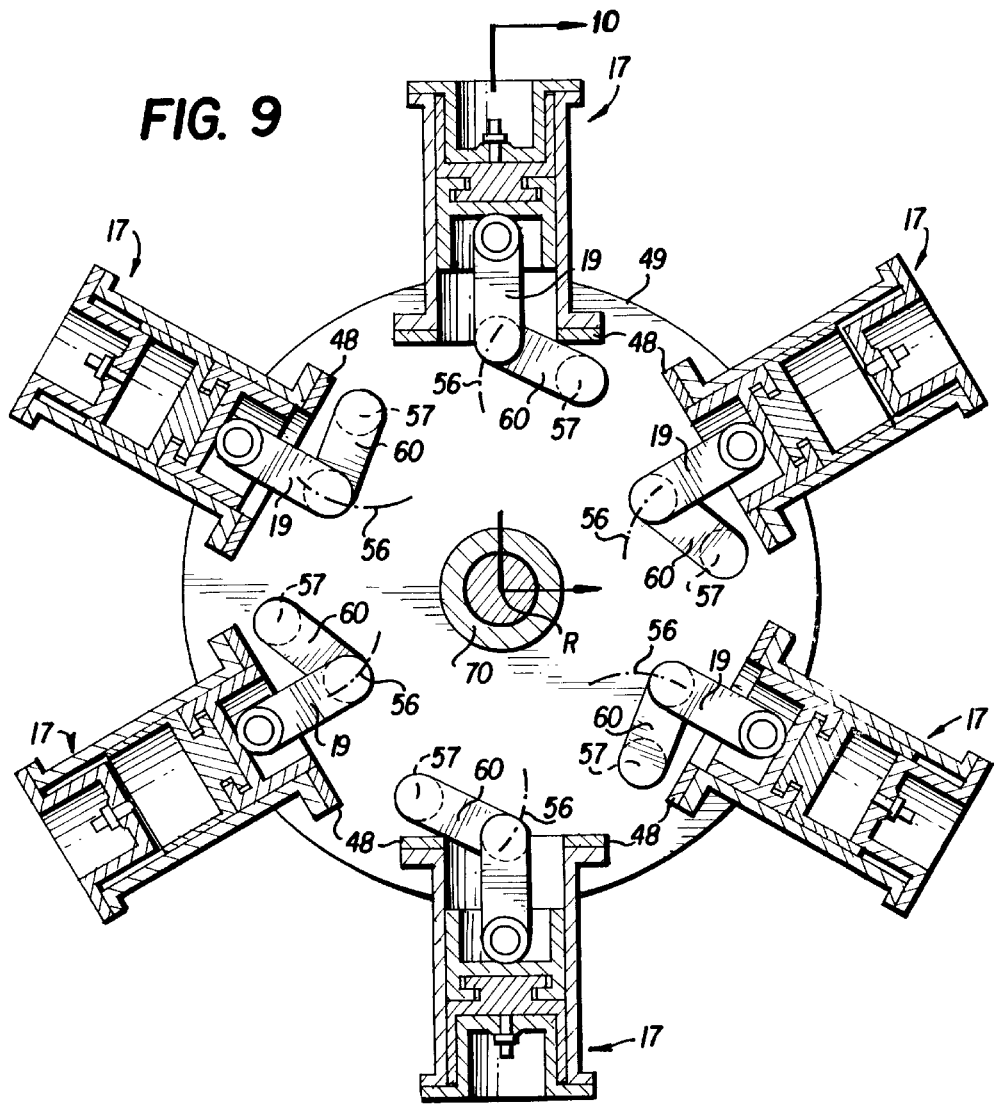
FIG. 9 is a sectional view of a novel piston-crank-cam assembly engine utilizing the new piston-cylinder configuration of the invention.
Figure 11:
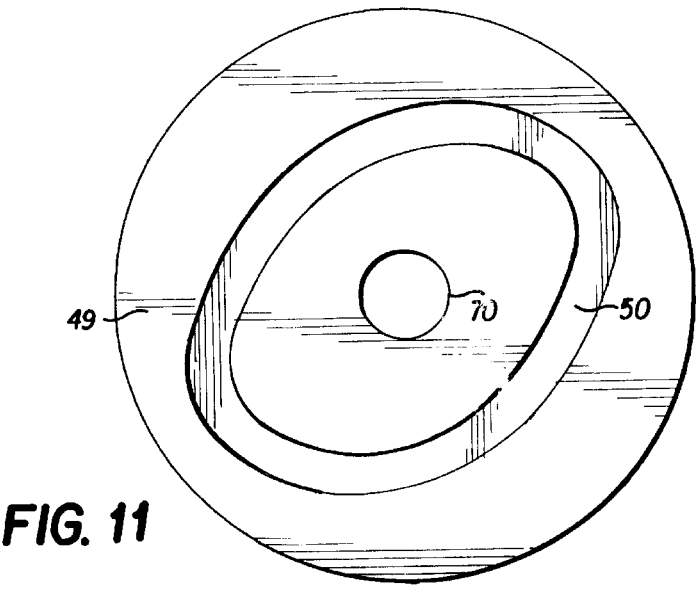
FIG. 11 is an elevation of a flywheel with a cam groove.

The piston-cylinder assembly shown in FIG. 7 can be used as a building block to obtain a multicylinder engine. Usually,, the piston moves back and forth in a cylinder and transmits power through a piston-crank assembly. FIGS. 9 to 11 show a new piston-crank-cam assembly to transmit power. The engine frame consists of two parallel polygonal plate portions 43 and 44 connected by a short tube portion 45. The number of sides on the plate portions is equal to the number of piston-cylinder assemblies. Rectangular plates 48 as seen in FIG. 10 are welded to the sides of plate portions 43 and 44 to form bases for supporting piston-cylinder assemblies 17 shown as being six in number. As seen in FIG. 9, the piston crank assemblies are disposed in surrounding relationship to the axis of rotation R of the output shaft 70. As shown in FIG. 11, a flywheel 49 has a cam groove 50 formed in one side thereof with two lobes. Each cylinder of the engine is provided with a crank shaft 52 which is journaled on plate portions 43 and 44. Connecting rod 19 is drivingly connected to the crank shaft 52 in a conventional manner for turning movement about an axis A. The crank shaft includes a pair of cranks 60 and a further crank 62 which carries a drive roller 61 disposed within cam groove 50. Drive roller 61 is mounted on crank 62 for turning movement about axis A. As piston 18 reciprocates in its cylinder, the lower end of connecting rod 19 and drive roller 61 oscillate along two parallel arcs 56 only one of which is seen in FIG. 9 as being associated with each piston-cylinder assembly. Arcs 56 have their centers at the center of oscillation of journal portions 57 of the crank shaft. These arcs 56 deviate very little from the center line of the cylinder thereby minimizing side forces between piston 18 and the associated cylinder wall. Drive rollers 61 are disposed in a cam groove 50 on one side of flywheel 49 which is an integral part of power output shaft 70 supported by ball bearings inside tube 45. FIG. 11 shows a two-lobed cam groove 50 having no plane of symmetry and which provides larger portions of an engine cycle for combustion and scavenging processes. By locating a cam on one side of a flywheel, more room is provided for adjusting the size of drive rollers 61 to reduce the stress between the cam and the drive rollers as well as providing a more compact engine configuration.

A piston-crank-cam assembly engine has fewer and lighter engine parts. The side forces between pistons 18 and the cylinder walls are negligibly small. A perfect engine balance is obtained with an even number of cylinder assemblies and cam lobes. These numbers are independent of each other and can be chosen freely. For a large number of cylinders, a piston-crank-cam assembly engine is more compact and less expensive. Any pair of opposite cylinders can be removed for maintenance without disturbing a perfectly balanced engine operation.

Figure 12:
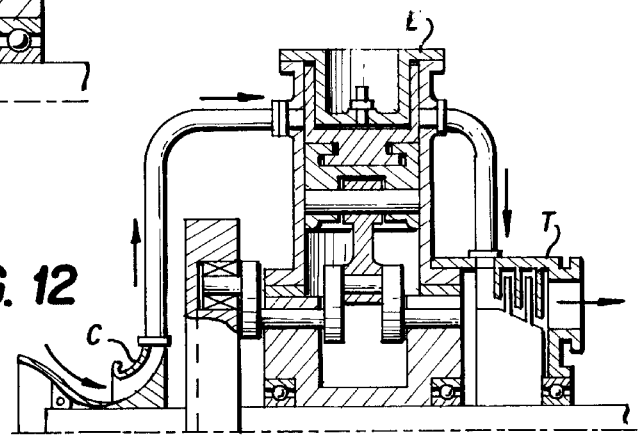
FIG. 12 shows a two-stroke CI engine compounded with an exhaust-gas turbine.

For better efficiency, a two-stroke engine is compounded with an exhaust-gas turbine. FIG. 12 shows a section of a compound engine through a typical cylinder assembly. An air compressor C and exhaust-gas turbine T are drivingly connected to two-stroke engine E. Scavenging air compressor C with a moderate compression ratio has a large enough capacity to supply compressed air to all cylinders of Engine E for scavenging and internally cooling the engine. Exhaust gases from all cylinders enter a nozzle box to drive the exhaust-gas turbine T. A constant-pressure cycle engine compounded with an exhaust-gas turbine has a cycle efficiency approaching that of a gas turbine with the same overall pressure ratio. This compound engine, however, has many advantages over a gas turbine. The scavenging air compressor absorbs much less power than the compressor of a gas turbine. It is several times more efficient than a gas turbine. It can be manufactured at a much lower cost. For aviation application, the total engine and fuel weight is comparable with that of a gas turbine especially for a long distance flight.

When the new compound engine shown in FIG. 12 is applied to automobiles, a small stroke/bore can be chosen with a high piston speed to reduce the engine weight, heat loss and gas leakage per cycle. The optimum engine torque and rpm can be obtained by having an appropriate number of cam lobes. Without a valve mechanism and the need for cooling and lubrication systems, the new compound engine has a much higher overall brake efficiency than any existing automotive engine. A compound engine of the present invention meets all the requirements of a green car. Having a high overall brake efficiency beyond the reach of an existing automotive engine, it is energy-efficient. By operating on a constant-pressure cycle to lower the firing temperature to minimize the formation of NOx and removing pollutant producing mechanisms from the cylinder, as well as having a built-in hot thermal reactor to eliminate whatever amount of HC, CO, and particulates remains among the exhaust gases, the engine can be substantially pollution-free. With a high brake efficiency and no need for lubrication oil, the engine is economical to operate. Having a perfect engine balance for riding comfort, it is marketable. Furthermore, it is fuel-flexible and can be built now at a low cost without waiting for the next generation technologies to emerge.

For ship propulsion, it is essential to have a high piston speed to reduce engine weight and a low engine rpm to increase propeller efficiency. These two conflicting engine requirements have never been achieved without a reduction gear box. Since a compound engine of the present invention can have a very high piston speed and a very low rpm at the same time by having a large number of cam lobes, it is most advantageous to apply it for ship propulsion. With a large number of large size cylinder assemblies, the new compound engine can meet the required total engine output of a marine power plant.

The invention has been described with reference to a preferred embodiment. Obviously, various modifications, alternations and other embodiments will occur to others upon reading and understanding this specifications. It is our intention to include all such modifications, alternations and alternate embodiments insofar as they come within the scope of the appended claims or equivalent thereof.

What is claimed is:

1. A piston-crank assembly comprising, a cylinder body having a bore formed therein, means defining an annular recess within said body and in communication with said bore, an inlet means in communication with said bore, an outlet means in communication with said bore, a piston mounted for reciprocation within said bore, said piston including an annular skirt defining a space therewithin, said skirt being adapted to fit within said annular recess, said skirt reciprocating within said recess during reciprocation of said piston within said bore, a fuel injection nozzle in communication with said space within the skirt, a power output shaft, a flywheel drivingly connected to said output shaft, said flywheel having a side with a cam groove formed therein, a crankshaft, a connecting rod having opposite ends, one of said ends being pivotally connected to said piston, the other of said ends being pivotally connected to said crankshaft for turning movement about an axis, a drive roller rotatably carried by said crankshaft for turning movement about an axis, said drive roller being disposed within said cam groove, said other end of said connecting rod and said drive roller oscillating along two parallel arcs during reciprocation of said piston.

2. An assembly as defined in claim 1 wherein said other end of the connecting rod and said roller turn about a common axis as they oscillate along said arcs.

3. An assembly as defined in claim 1 wherein said arcs deviate very little from a center line passing through the associated cylinder.

4. A piston-crank-cam assembly engine comprising a plurality of piston-cylinder assemblies each of which comprises a cylinder body having a bore formed therein, means defining an annular recess within said body and in communication with said bore, an inlet means in communication with said bore, an outlet means in communication with said bore, a piston mounted for reciprocation within said bore, said piston including an annular skirt defining a space therewithin, said skirt being adapted to fit within said annular recess, said skirt reciprocating within said recess during reciprocation of said piston within said bore, a fuel injection nozzle in communication with said space within the skirt, a power output shaft having an axis of rotation, a flywheel drivingly connected to said output shaft, said flywheel having a side with a cam groove formed therein, said piston-crank assemblies being disposed in surrounding relationship to said axis of rotation of the output shaft, a plurality of crank shafts, each of said piston-crank assemblies having a different one of said crank shafts associated therewith, a plurality of connecting rods each of which has opposite ends, one of said ends of each connecting rod being pivotally connected to an associated piston, the other of said ends of each connecting rod being pivotally connected to an associated crankshaft for turning movement about an axis, a drive roller rotatably carried by each of said crank shafts for turning movement about an axis, said drive rollers all being disposed within said cam groove at spaced points therealong, said other end of each of said connecting rods and the associated drive rollers oscillating along two parallel arcs during reciprocation of said piston.

5. An assembly as defined in claim 4 wherein said other ends of each of the connecting rods and the associated rollers turn about a common axis as they oscillate along said arcs.

6. An assembly as defined in claim 5 wherein said arcs deviate very little from a center line passing through the associated cylinder.

* * * * *